(12) United States Patent
Prevot et al.

(10) Patent No.: US 8,671,525 B2
(45) Date of Patent: Mar. 18, 2014

(54) TIGHTENING DEVICE WITH COLLAR

(75) Inventors: Fabrice Prevot, Selles sur Cher (FR); Cyriaque Fouqueray, Romorantin (FR); Mickaël Gapteau, Menetou sur Cher (FR)

(73) Assignee: Etablissements Caillau, Issy-les-Moulineaux (FR)

( * ) Notice: Subject to any disclaimer, the term of this patent is extended or adjusted under 35 U.S.C. 154(b) by 291 days.

(21) Appl. No.: 13/003,048

(22) PCT Filed: Jul. 10, 2009

(86) PCT No.: PCT/FR2009/051390
§ 371 (c)(1),
(2), (4) Date: May 23, 2011

(87) PCT Pub. No.: WO2010/004233
PCT Pub. Date: Jan. 14, 2010

(65) Prior Publication Data
US 2011/0215574 A1 Sep. 8, 2011

(30) Foreign Application Priority Data
Jul. 10, 2008 (FR) ...................................... 08 54699

(51) Int. Cl.
*F16L 25/04* (2006.01)
(52) U.S. Cl.
USPC .................................. 24/19; 24/280; 285/419
(58) Field of Classification Search
USPC ...... 24/279, 419, 280, 284, 19, 201 S, 274 R, 24/274 P, 274 WB, 20 R, 282, 286; 285/23, 285/252, 253, 254, 245, 419
See application file for complete search history.

(56) References Cited

U.S. PATENT DOCUMENTS

| | | | | |
|---|---|---|---|---|
| 4,365,393 A * | 12/1982 | Hauffe et al. | ................... | 24/279 |
| 5,280,970 A * | 1/1994 | Straub | ........................... | 285/112 |
| 6,490,765 B2 * | 12/2002 | Anthes et al. | ................... | 24/279 |
| 6,796,004 B2 * | 9/2004 | Belisle et al. | ................... | 24/279 |
| 8,181,314 B2 * | 5/2012 | Mohlin et al. | ................... | 24/279 |
| 2005/0108859 A1 * | 5/2005 | Amendolea et al. | ........... | 24/270 |
| 2008/0184536 A1 * | 8/2008 | Rigollet et al. | ................ | 24/279 |
| 2010/0223764 A1 * | 9/2010 | Prevot et al. | .................... | 24/279 |

FOREIGN PATENT DOCUMENTS

FR 2559220 8/1985
WO WO 2006/109001 10/2006

OTHER PUBLICATIONS

PCT Search Report corresponding to the PCT/US2009/051390 application.

* cited by examiner

*Primary Examiner* — Robert J Sandy
*Assistant Examiner* — Rowland D Do
(74) *Attorney, Agent, or Firm* — Kilpatrick Townsend & Stockton LLP

(57) ABSTRACT

The collar has a roughly cylindrical metal band and a pair of ears projecting from this band and defining a tightening space between themselves. It also has a tightening device for pulling these ears towards each other. The ears have an extension which is bent around behind each ear away from the other ear and which has a hole for the tightening rod and the tightening device, this hole being lined up with a hole in the forward part of the same area ear. A bracing space is provided between the bent extension and this forward part. The holes of the extension and of the forward part each have an edge portion with a guard which extends into the bracing space and an edge portion without a guard which is aligned with the guard of the other hole.

16 Claims, 8 Drawing Sheets

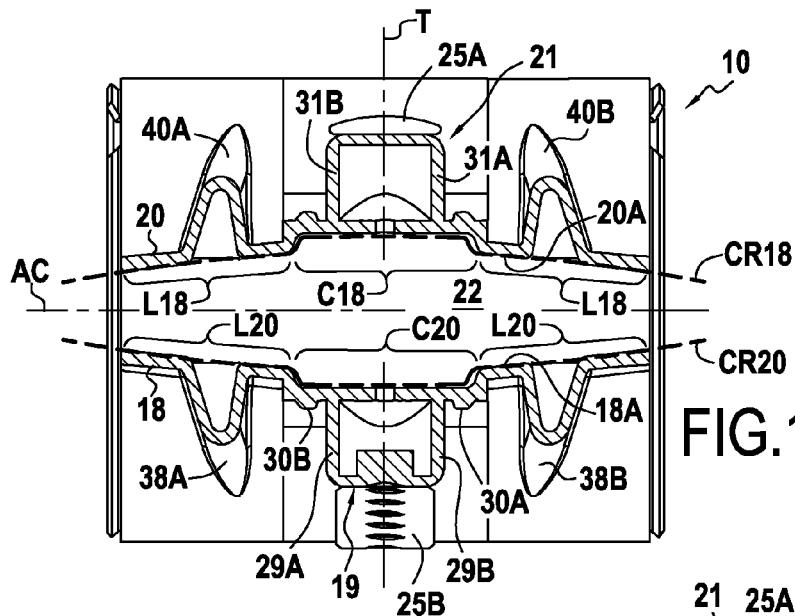
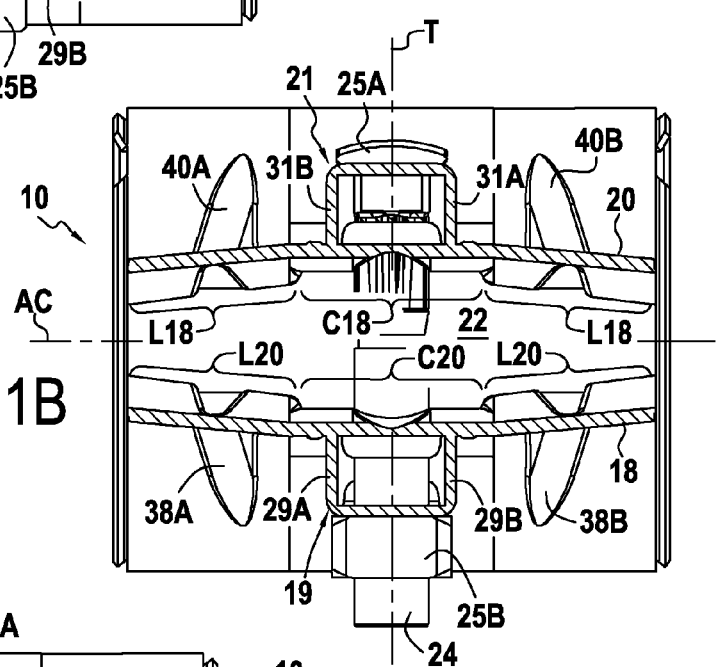
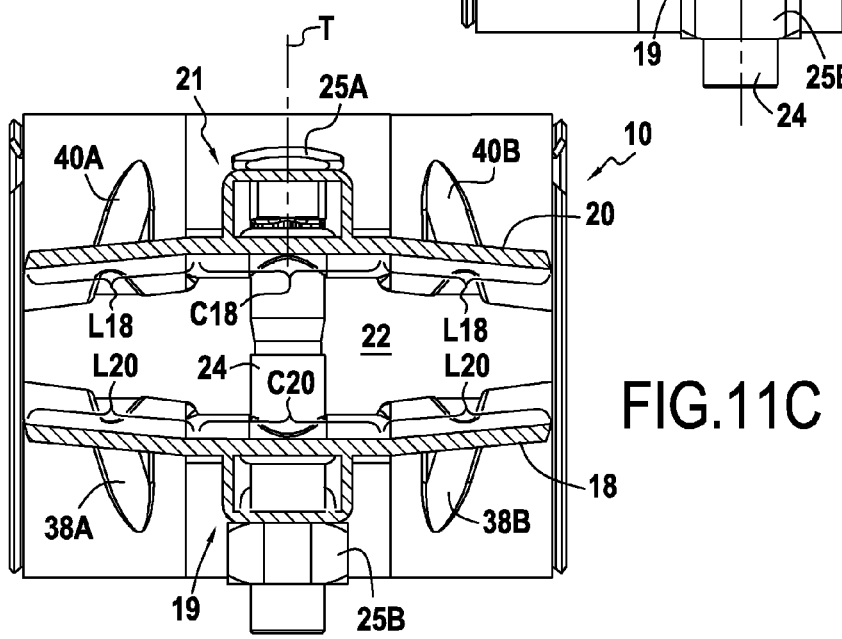

TIGHTENING DEVICE WITH COLLAR

This application is a National Stage of International Application No. PCT/FR2009/051390, filed Jul. 10, 2009, which claims the benefit of priority to French Patent Application FR 0854699 filed Jul. 10, 2008, the disclosures of these applications are hereby incorporated by reference in their entireties.

The present invention relates to a clamping device comprising a collar suitable for being placed around objects to be clamped, the collar having a substantially cylindrical metal belt, at least one pair of lugs that project relative to said belt and that define a tightening space between their respective front portions, and at least one tightening rod and two tightening members co-operating with said rod, and with respective ones of bearing portions of the two lugs of the pair, so as to bring the lugs together in such a manner as to cause the belt to be tightened by reducing its diameter, at least one of the lugs of the pair being a lug having an extension, the bearing portion of which lug is formed in an extension of said lug, which extension is folded back towards the back of said lug, away from the other lug of the pair, and is provided with a hole for receiving the tightening rod and that is situated facing a hole in the front portion of the same lug, a bracing space being provided between the folded-back extension and said front portion.

A clamping collar of this type is known, for example, from PCT Patent Application WO 2006/109001. For performing the clamping, the belt of that collar is disposed around the object(s) to be clamped, and the lugs, which form raised lips that are upstanding relative to the belt, are brought closer together so as to decrease the width of the tightening space (in the form of a longitudinal slot) that exists between them, so as to reduce the diameter of the belt. As indicated in PCT Application WO 2006/109001, since the tightening forces are exerted on the extension that is folded back towards the rear of the lug having an extension, it is possible for the tightening forces to be better distributed over said lug.

Thus, the collar described in Application WO 2006/109001 is generally satisfactory. However, the Applicant has observed that, for certain uses requiring, in particular, tightening forces that are high, guiding the tightening rod in the holes through the lug having an extension can be insufficient. In order to save money, the belts of such collars tend to be made of ever thinner sheet metal. As a result, when the tightening rod is a threaded rod, the threads might catch on the edges of the tightening holes, thereby giving rise to a reduction in the clamping efficiency of the collar (such efficiency being the ratio between the torque applied to the tightening members and the clamping torque actually obtained) and damaging the threaded rod.

In addition, if the tightening rod is supported only by the edges of the holes, the thickness of which edges corresponds to the thickness of the sheet metal from which the belt is made, that support is exerted over a length that can be insufficient, and might give rise to the rod buckling during tightening of the collar, in particular when the tightening forces are high.

In order to remedy those drawbacks, FIG. 16 of WO 2006/109001 suggests edging the holes with cylindrical bushes that extend into the bracing space.

Unfortunately, the material used to make the bushes, in particular by stamping, is taken from the remainder of the lug, and forming such bushes gives rise to very considerable work-hardening forces affecting the entire peripheries of the holes, which can ultimately weaken the lug. Overall, there is a risk that the cylindrical bushes might "consume" too much material and might correspond to local weaknesses.

An object of the invention is to improve this state of the art further by proposing a solution that makes it possible to improve the supporting of the tightening rod in the tightening holes in the lug having an extension, and that is substantially exempt from the above-mentioned drawbacks.

This object is achieved by means of the fact that each of the holes in the extension and in the front portion has an edge portion provided with a visor that extends into the bracing space, and an edge portion that is not provided with a visor and that extends facing the visor of the other hole.

Thus, in accordance with the invention, the visors, each of which extends over only a portion of the edge of the corresponding hole in the extension, improve the support of the tightening rod in said holes. These visors afford the tightening rod contact surfaces that are larger in area than holes having edges that are of thickness that is only the thickness of the sheet metal. The contact stresses between the tightening rod and the holes are thus distributed over said contact surfaces of increased area. The two visors are offset angularly relative to each other, i.e. they are disposed in "staggered" manner. As a result, the bolt is supported in excellent manner while having a capacity to move slightly by tilting during the tightening. One of the visors retains the bolt so as to prevent it from moving in a first direction, while the other visor retains it so as to prevent it from moving in another direction that is substantially opposite from the first direction. By implementing these visors only, very little material is used, so that the lug having an extension is not significantly weakened in the region of the tightening holes. In addition, forming each visor gives rise to work-hardening forces that are only low (or, in any event, only localized) because the visor extends over a portion only of the periphery of the tightening hole, so that it is possible to avoid the risks of excessive work-hardening around the holes that might give rise to ruptures.

Advantageously, the visors are folded-back portions of the edges of the holes.

Forming the visors merely by folding back corresponding portions of the edges of the holes is an extremely simple way of forming them, without, as indicated above, giving rise to work-hardening forces that are too high.

Advantageously, the visor of the hole in the extension is closer to the axis of the belt than the visor of the hole of the front portion.

During the tightening, the lug having an extension can tend slightly to be inclined towards the axis of the collar by tilting about its point of attachment to the belt. In other words, in such an event, the front portion of the lug tends to move closer to the axis of the collar, while the base of the back portion, formed by the extension, tends slightly to move away from said axis. There is also a risk that the lug might unwrap, i.e. that the extension of the lug might tend to unfold under the effect of the tightening forces. Disposing visors as indicated above makes it possible to limit such tilting and such unwrapping by means of the support formed for the tightening rod.

Advantageously, the other lug of the pair is also a lug having an extension, the bearing portion of which lug is formed in an extension of said lug, which extension is folded back towards the back of said lug, away from the other lug of the pair, and is provided with a hole for receiving the tightening rod and that is situated facing a hole in the front portion of the same lug, a bracing space being provided between the folded-back extension and said front portion.

Another aspect of the invention is applicable to a clamping device comprising a collar suitable for being placed around objects to be clamped, the collar having a substantially cylindrical metal belt, at least one pair of lugs that project relative to said belt and that define a tightening space between their respective front portions, and at least one tightening rod and two tightening members co-operating with said rod, and with respective ones of bearing portions of the two lugs of the pair, so as to bring the lugs together in such a manner as to cause the belt to be tightened by reducing its diameter.

In this other aspect, when the collar is in the non-tightened state, the width of the tightening space, as measured in the longitudinal direction of the tightening rod, is greater around said rod than in regions of the lugs that are remote from the tightening rod over at least substantially the entire height of the tightening rod, as measured perpendicularly to the axis of the belt and to the longitudinal direction of said rod.

In particular for collars having wide strips (width being measured in the same direction as the axis of the cylindrical belt), the applicant has observed that there is a risk of the tightening forces being distributed poorly over the width of the strip, i.e. along the length of the tightening space. In order to mitigate this risk, it is possible to make provision for the collar to have a plurality of pairs of lugs distributed uniformly over said width. This solution suffers from the drawback of increasing the manufacturing costs because it is necessary to provide one set of tightening equipment for each lug.

This poor distribution of the tightening forces is due to the fact that said forces are exerted primarily in the region that lies around the tightening rod, while the forces are lower in the regions remote from said rod. The applicant has observed that, by forming the lugs in such a manner that the width of the tightening space is greater around the rod than in the regions of the lugs that are remote from said rod, the distribution of the tightening forces is improved.

Conventionally, these forces cause the regions of the lugs that are close to the rod to be moved together to a greater extent than are the regions remote from said rod. Thus, if the edges of the lugs are initially rectilinear, the tightening primarily affects the regions close to the rod that tend to "pull" with them the more remote regions. Ultimately, the regions of the lugs that are remote from the tightening rod move together to a lesser extent than do the regions close to said rod. In said remote regions, the width of the tightening space is thus greater than was desired.

In this aspect of the invention, the width of the tightening space is initially narrower in the remote regions of the tightening rod than in the regions close to the rod. This initial difference compensates for the above-mentioned effect, so as to make it possible, after tightening, to obtain a residual space between the lugs that is of limited width over the entire length of the lugs. Therefore, the total bearing area of the belt via which said belt bears against the object(s) to be clamped is increased, and the effectiveness of the clamping is improved.

This aspect of the invention also procures another very significant effect. The particular initial shaping of the lugs that increases the width of the tightening space in the region of the tightening rod causes a "keystone" effect. In other words, each of the regions of the lugs that is close to the rod forms the keystone that transmits to the adjacent (remote) regions of the lugs the tightening forces that are exerted on it. In other words, the keystones formed by these regions of the lugs tend, under the effect of the tightening to drive the adjacent regions with them by pushing said adjacent regions rather than by pulling them. As a result, the tightening forces are distributed better and therefore the clamping is more effective.

In the definition of the device in this other aspect of the invention "at least substantially the entire height of the tightening rod" means over more than one half of said rod and preferably over at least 70% of said height. In particular, this increased width of the tightening space may even be observed over the entire height of the rod, and even over slightly more than said height (in the range 110% to 120% or even more).

Advantageously, seen in a plane parallel to the axis of the belt, and containing the axis of the tightening rod, and when the belt is in the non-tightened state, each lug of said pair has a concave shape, the concave side of which faces towards the other lug of the pair.

This generally concave shape makes it possible to guarantee the effectiveness of the above-mentioned "keystone" effect.

Preferably, there exists at least one plane of concavity that is parallel to the axis of the belt and to the longitudinal direction of the tightening rod, in which plane the intersection via which a lug of the pair intersects with said plane coincides, over most of its length with a concave reference curve, whose trough lies in the region of the tightening rod.

As explained below, the portions of the lugs can have departures from said reference curve. In particular, they can locally have stamped shapes having particular functions. However, the fact that they coincide over most of their lengths with the concave reference curves makes it possible to avoid points of inflection that are too marked and to make the distribution of the tightening forces more uniform.

Advantageously, each of the front portions of the two lugs of the pair has a central portion, and two side portions that extend over at least the height of the tightening rod, as measured perpendicularly to the axis of the belt and to the longitudinal direction of said rod, and that have shapes such that the side portions protrude towards the opposite lug relative to the central portion at least over said height of the tightening rod.

Thus, the above-mentioned "keystone" effect is indeed exerted all the way around the zones directly concerned by the tightening, i.e. the zones extending around the tightening rod. In particular, it is very important for the tightening forces to be well distributed not only towards the points of attachment via which the lugs are attached to the belt of the collar, but also further away from said belt, all the way around the tightening rod, even in the regions remote from the center of the belt.

Advantageously, the extension has flanges co-operating with the back face of the front portion of the extended lug, on either side of the hole of said front portion.

These flanges make it possible to form spacers avoiding any collapse of the bracing space that could take place when the folded-back extension and the front portion of the lug in question move closer together.

Advantageously, the flanges of the extension are retained so as to prevent them from moving apart.

Preventing the flanges of the extension from moving apart makes it possible to guarantee that they act as spacers.

Advantageously, at least one flange of the extension is retained so as to prevent it from sliding against the back face of the lug in a plane substantially perpendicular to the axis of the belt.

In which case, advantageously, one of the elements constituted by the free edge of the flange retained so as to prevent it from sliding against the back face of the lug in a plane that is substantially perpendicular to the axis of the belt, and by the back face of the front portion of the lug is provided with a notch, while the other element is provided with a projection engaged in said notch.

It is indicated above that, when the tightening forces are particularly high, there exists a risk that the lugs might tend to tilt about their points of attachment to the belt of the collar and that the one or more lugs having extensions might tend to unwrap by the extension(s) unfolding. It is also indicated that the preferred positioning of the support visors, respectively close to the axis of the belt for the visor of the hole in the extension and further away from said axis for the visor of the front portion, makes it possible, by means of the co-operation between the tightening rod and said visors, to ensure that that tendency is effectively countered.

However, as a result, high forces are exerted on the tightening rod.

The applicant has thus observed that it is particularly astute for the flanges of the extension, when such flanges are present, also to be used to counter this tendency for tilting. By them being prevented from sliding against the back face of the lugs, they force the folded-back back extension and the front portion of the lug to remain substantially in their initial positions, even when tightening is performed under a high force, and therefore prevent, in particular, the region of the folded-back extension that is closest to the axis from tending to lift slightly relative to said axis.

Implementing this anti-slip retaining by means of a projection-and-notch set of the above-mentioned type is particularly inexpensive.

The invention can be well understood and its advantages appear more clearly on reading the following detailed description of an embodiment shown by way of non-limiting example. The description refers to the accompanying drawings, in which.

Figure 13:
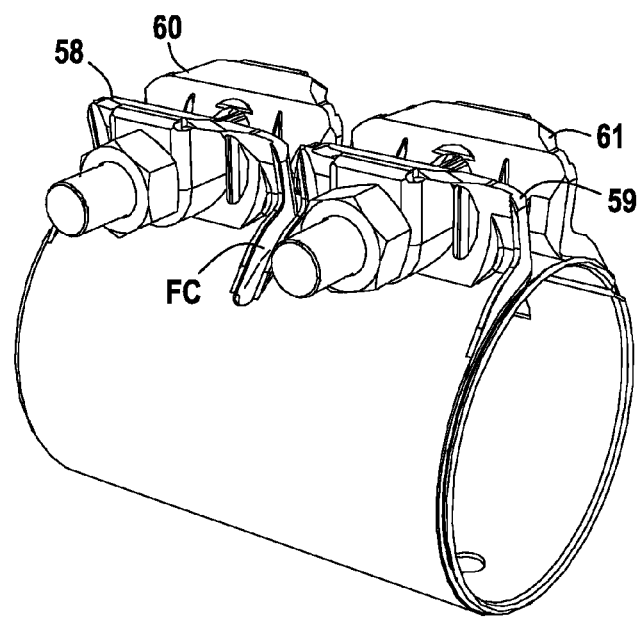
Figure 12A:
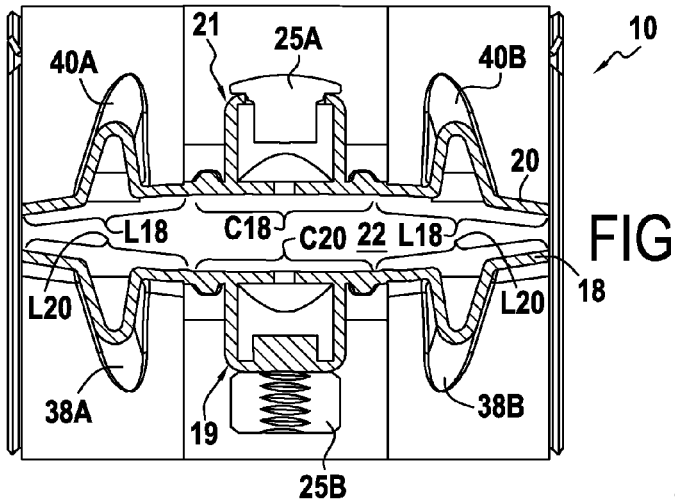
Figure 12B:
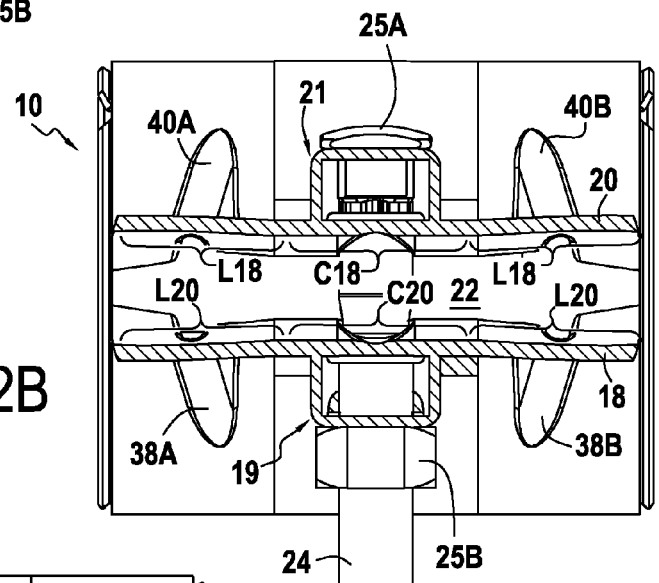
Figure 12C:
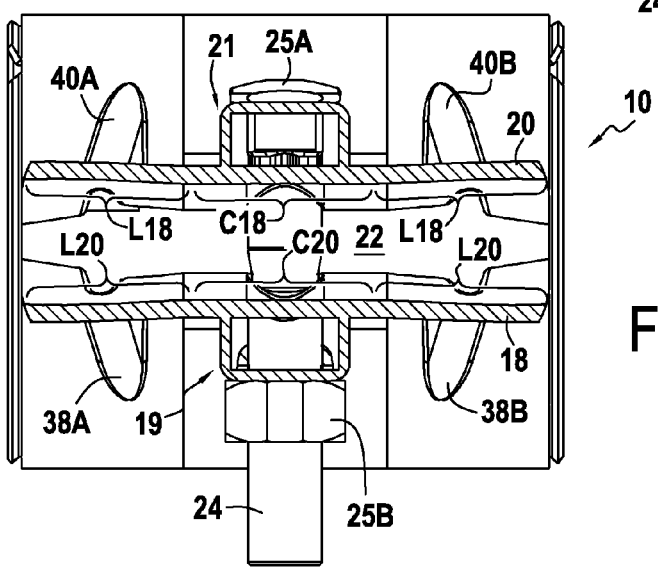

FIGS. 11A, 11B, and 11C are section views on planes A, B, and C, respectively showing the shaping of the collar prior to tightening;

FIGS. 12A, 12B, and 12C are views respectively analogous to FIGS. 11A, 11B, and 11C, once the collar is tightened; and FIG. 13 is a perspective view of a variant embodiment of the collar.

Figure 1:
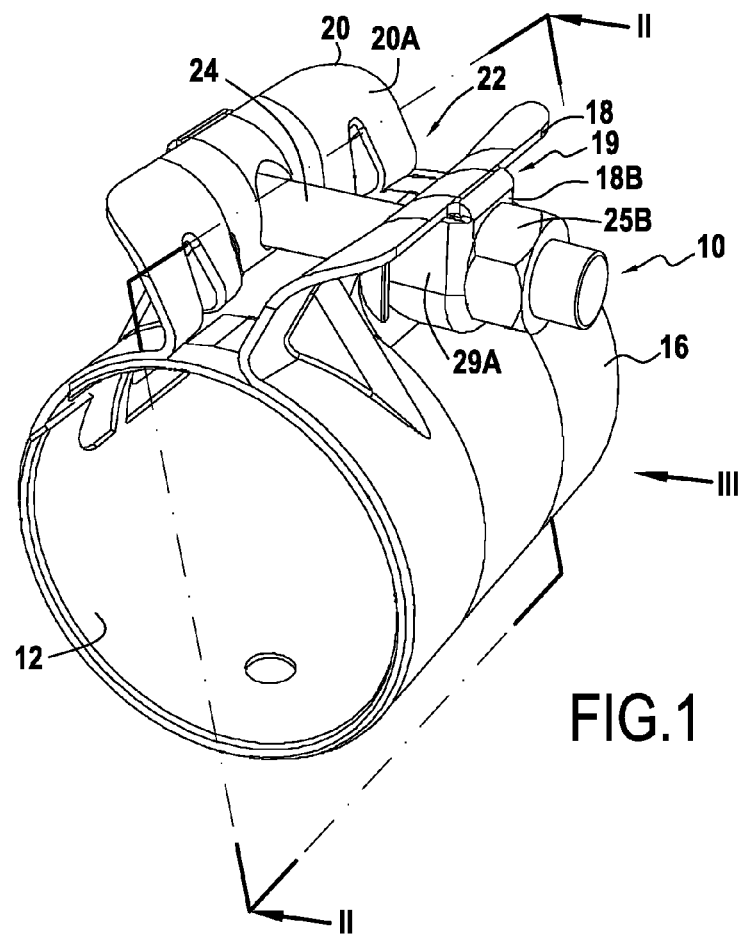
FIG. 1 is a perspective view of a collar of the invention.
Figure 2:
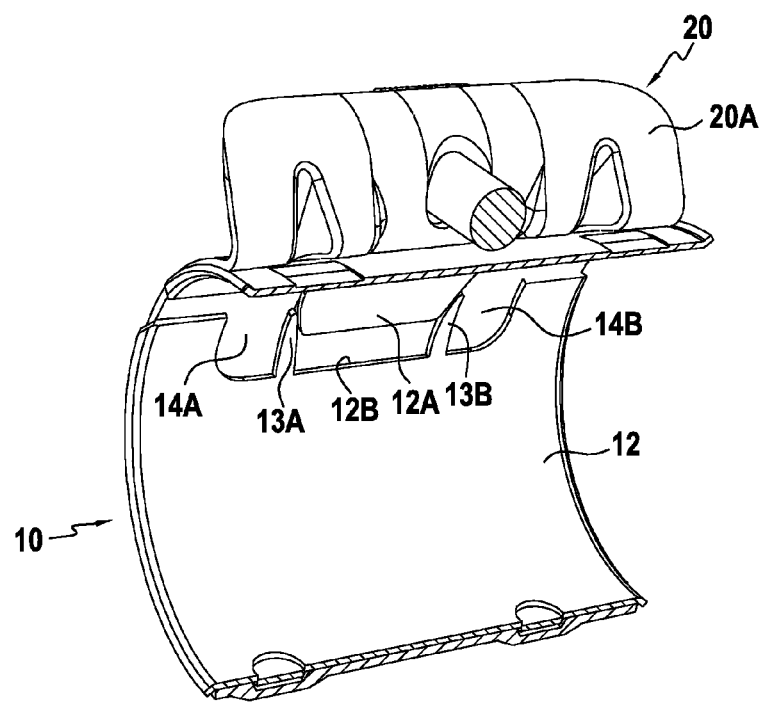
FIG. 2 is a section view on plane II-II of FIG. 1.

The clamping device of FIGS. 1 and 2 comprises a collar 10 inside which a sealing ring 12 is disposed for the purpose of surrounding the facing ends of two smooth tubes, coupled together in leaktight manner by means of said device. The sealing ring can be implemented in the manner known by Patent Application EP 1 181 477 or by Application WO 2006/109002. For example, as shown in FIGS. 1 and 2, its ends are provided respectively with a male shaped portion 12A and with a female shaped portion 12B, which receives the male shaped portion during tightening and which is defined between two contact tabs 13A and 13B. The leaktight contact is established on the contact edges of the contact tabs 13A and 13B that can be folded during the tightening so as to facilitate penetration of the male shaped portion into the female shaped portion. Setbacks 14A and 14B facilitating this folding are advantageously provided on the sides of the tabs 13A and 13B that face away from the notch 12B that forms the female shaped portion.

The embodiment shown in FIGS. 1 and 2 is particularly adapted to clamping together the facing ends of two smooth tubes.

However, the clamping device of the invention is not limited to this type of use. In general, the collar is suitable for clamping any circularly symmetrical object. It may be used for clamping a pipe onto an end-piece, or indeed to clamp tube fittings having projecting clamping surfaces, over which the belt of the collar comes to bear by having a suitably shaped portion, e.g. a belt having a recessed or V-shaped section.

The present patent application concerns itself with the particular shaping of the tightening lugs of the collar. The collar is made from a strip of metal that is rolled up on itself. It has a belt 16 that, as can be seen in FIG. 1, is substantially cylindrical. This means that the inside periphery of said belt lies on a cylinder but that, in order to make tightening possible, the cylinder formed by said inside periphery is not closed. The collar has a pair of lugs 18 and 20 that project relative to the belt and that define a tightening space 22 between them. As can be seen, the lugs are formed at the longitudinal ends of the strip from which the collar is formed, and they are upstanding in that they extend substantially radially outwards from the belt.

It can also be seen that the device is provided with a tightening rod 24 and two tightening members, respectively 25A and 25B (see also FIGS. 4, 8, and 9), that co-operate with said tightening rod to tighten the collar. In this example, the tightening rod 24 is the shank of a threaded bolt, whose head 25A constitutes the first tightening member, while the second tightening member 25B is constituted by a nut that co-operates by screw-fastening with the threaded portion of the bolt.

The two lugs 18 and 20 face each other, on either side of the tightening space 22. Each of them thus has a front portion 18A, 20A that faces the other lug, i.e. towards the tightening space 22. Each of them also has a bearing portion 18B, 20B with which a respective tightening member 25B, 25A co-operates. The bearing portions are disposed at the backs of the lugs, opposite from the above-mentioned front portions 18A and 20A.

Both lugs 18 and 20 are lugs having extensions. This means that, for each lug, the front portion is formed in an extension, respectively 19 and 21, of the lug that is folded back towards the back of the lug in question, away from the other lug in the pair.

Figure 5A:
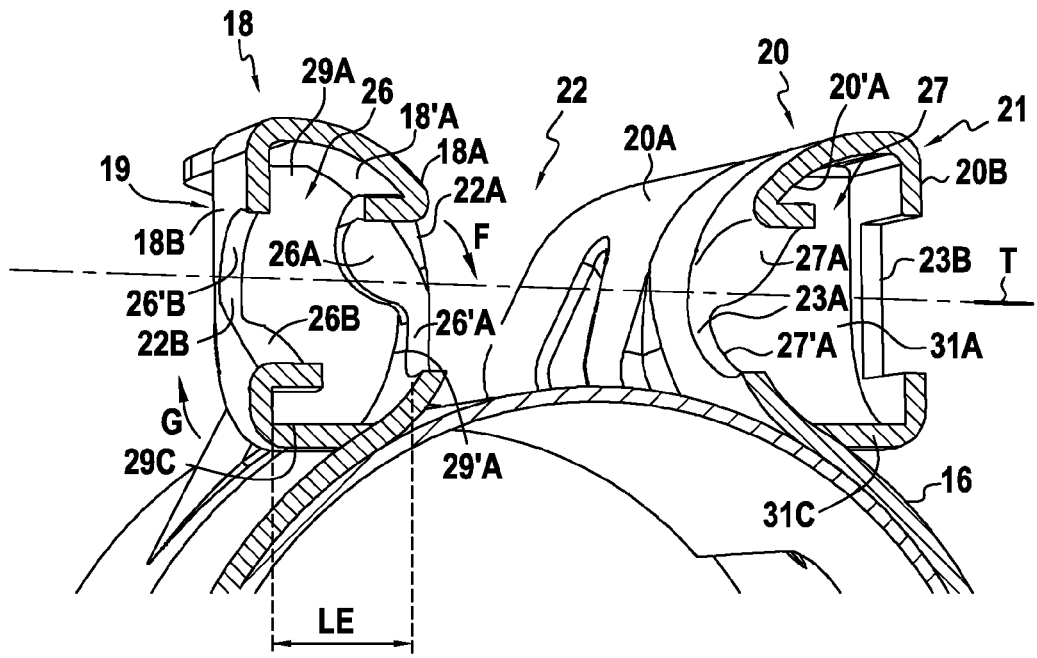
FIG. 5A is a fragmentary view in section on plane IV-IV of FIG. 3.

For the purpose of passing the tightening rod, the front portion and the bearing portion of each lug are provided with respective facing holes. Thus, in FIG. 5A, it can be seen that the front portion of the lug 18A is provided with a hole 22A, while its bearing portion is provided with a hole 22B. Similarly, for the lug 20, the front portion 20A is provided with a hole 23A, while its back bearing portion is provided with a hole 23B. The holes 22A, 22B, 23A, and 23B are aligned in register with a diameter so as to enable the tangentially extending tightening rod 24 to pass through them. With reference, in particular, to FIG. 5A, it can be seen that, for each lug, a bracing space, 26 for lug 18 and 27 for lug 20, is provided between the front portion of the lug and the bearing portion formed in the folded-back extension.

In FIG. 5A, it can also be seen that, for the lug 18, each of the holes 22A and 22B has an edge portion that is provided with a visor, respectively 26A and 26B, that extends into the bracing space 26. Similarly, for the lug 20, the hole 23A also has an edge portion provided with a visor 27A that extends into the bracing space 27. It can be seen that the hole 23B is not provided with a visor. However, it could be equipped with one, in the same way as the hole 22B in the lug 18. However, in the example shown, said hole 23B has an anti-rotation outline. The outline of this hole has a plurality of flats (in this example, it is a square outline) that can thus co-operate with flats on the rod 24 so as to prevent said rod from moving in rotation about its axis. The flat or any other anti-rotation shape is, however, compatible with the presence of a visor. For example, the flat or the anti-rotation shape may be disposed opposite from a visor analogous to the visor 26B.

It can be seen that the visor 27A extends over only a portion of the outline of the hole 23A, another portion 27'A of said outline being constituted merely by the edge of the cut-out hole, the thickness of which edge is equal to the thickness of the strip from which the belt is made, and is not provided with a visor. The visor 27A extends remotely from the axis AC (see FIG. 4) of the collar, while the portion of the outline 27'A that is not provided with a visor is closer to the axis.

As regards the lug 18, it can be seen that the hole 22A has a portion 26'A of its outline that is not provided with a visor, in the same way as the hole 22B has a portion 26'B of its outline that is not provided with a visor. Along the axis T of the rod 24, the visor 26A extends facing the portion 26'B of the hole 22B, in the same way as the visor 26B extends facing the portion 26'A of the outline of the hole 22A. In other words, the visors 26A and 26B are offset relative to each other or "in phase opposition". The visors 26A and 26B form wall portions that are substantially cylindrical and each of which extends over a length L, measured parallel to the axis T of the rod 24, lying in the range 20% of the length LE of the bracing space 26 to 50% of said length of the bracing space in the region of the visor in question. The edges of the visors 26A and 26B are curved about the axis T, so as to come progressively closer to the portion 26'A or 26'B that is not provided with a visor.

It can be seen that the visor 26B of the hole in the extension 19 is closer to the axis AC of the belt than the visor 26A of the hole in the front portion. It can also be seen that the visors are folded-back portions of the edges of the holes. It can be understood that the rod 24 co-operating with the visor 26A tends to prevent said visor from coming closer to the axis AC in the direction F indicated in FIG. 5A, and that, similarly, the visor 26B can co-operate with said rod 24 to prevent the extension from tilting in the direction G also indicated in FIG. 5A.

It can also been seen that each of the extensions 19 and 21 has flanges, respectively 29A and 29B for the extension 19 and 31A and 31B for the extension 21. For each lug, these flanges co-operate with the back face, respectively 18'A or 20'A, of the front portion of the lug. In particular, in FIG. 5A, it can be seen that the free edge 29'A of the flange 29A bears against the back face 18'A of the front portion 18A of the lug 18.

Advantageously, the above-mentioned flanges are formed by stamping the extension in question. As can be seen, in particular in FIG. 5A, each of the extensions 19 and 21 also has a web portion, respectively 29C and 31C, that extends substantially parallel to the axis T of the tightening rod and that is the portion of the extension that is closer to the axis AC of the belt.

Figure 6:
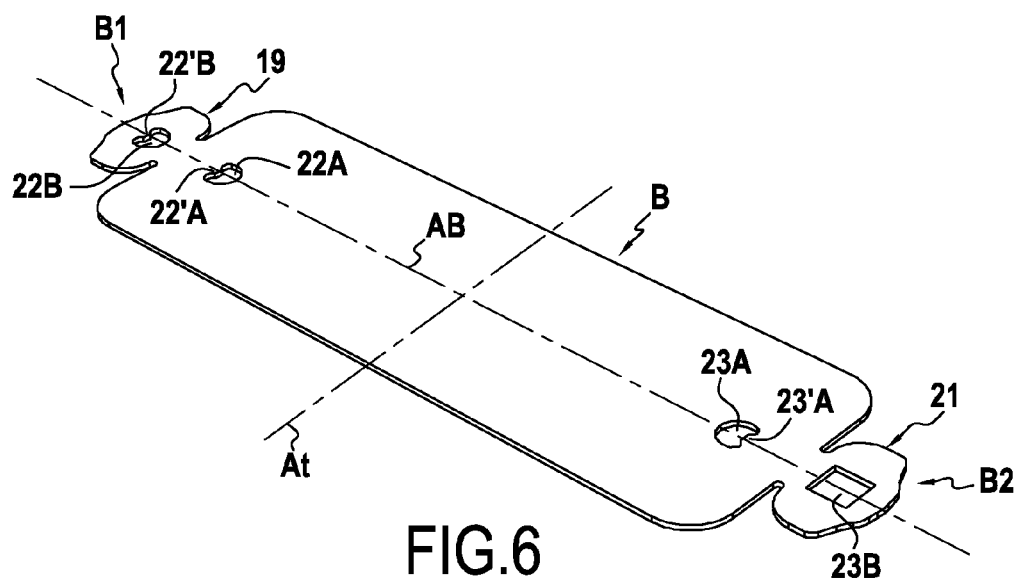
FIG. 6 shows the strip from which the belt and the lugs of the collar are made before said strip is rolled up.

FIG. 6 shows the strip B from which the collar is made, as flat, prior to being rolled up on itself and prior to being subject to the above-mentioned stamping. It can be seen that the longitudinal ends B1 and B2 of said strip are cut out to have the extensions 19 and 21. The holes 22B and 23B are cut out in respective ones of the extensions 19 and 21. It can also be seen that the holes 22A and 23A are cut out in the central portion of the strip B, in the vicinities of respective ones of the two extensions.

Figure 7:
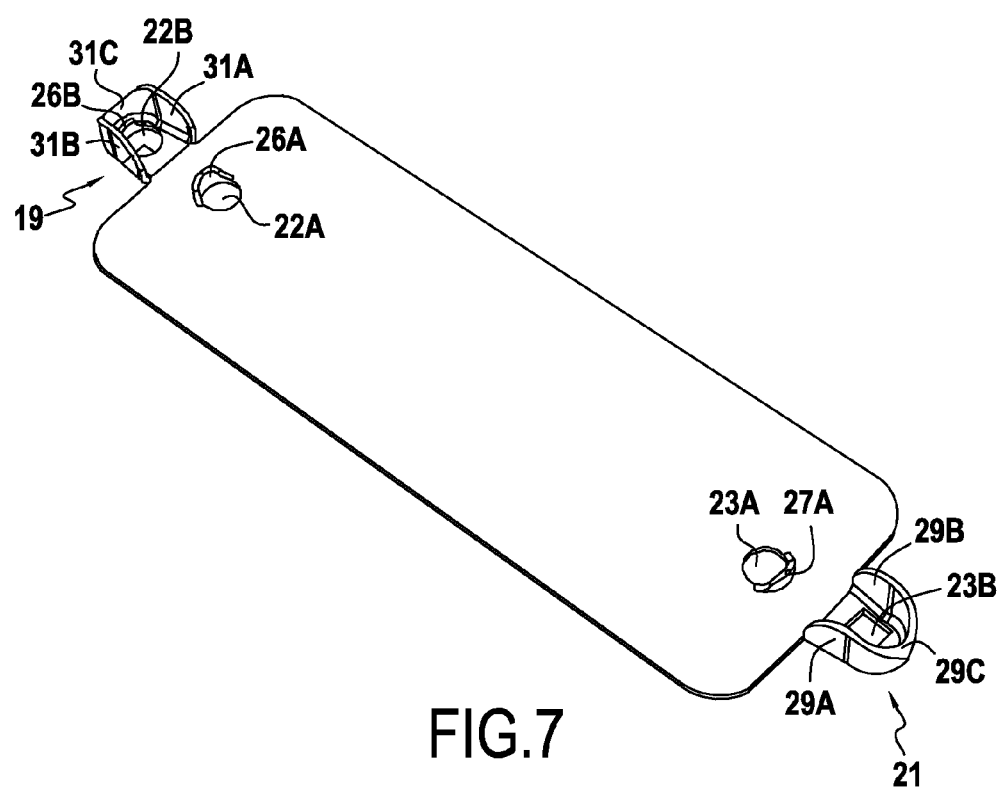
FIG. 7 shows the same strip as FIG. 6, once the visors have been formed for the holes, and once the fold-backs of the extensions and the flanges thereof have been stamped.

The hole 23B is of square section. Conversely, the holes 22A, 22B, and 23A are of substantially kidney-shaped section. The convex curves of the kidney-shapes face towards the middle transverse axis At of the strip B. More precisely, the portion of the outline of each of these holes that faces towards said axis At is in the shape of a portion of a circle. The portion of the periphery of each of these holes that is remote from the axis At has a convex tab, respectively 22'A, 22'B, or 23'A projecting into the hole. In FIG. 7, these tab-shaped convex portions have been deformed so that they extend substantially perpendicularly to the plane of the strip so as to form the visors 26A, 26B, and 27A of the edges of the peripheries of the holes. It can also be seen in FIG. 7 that the flanges of the extensions have been stamped, at the same time as the web portions of said extensions formed towards their free ends. The free ends of said flanges are of shape suitable for co-operating with the back faces of the front portions of the lugs, while taking account of the curvature of the back faces.

Figure 3:
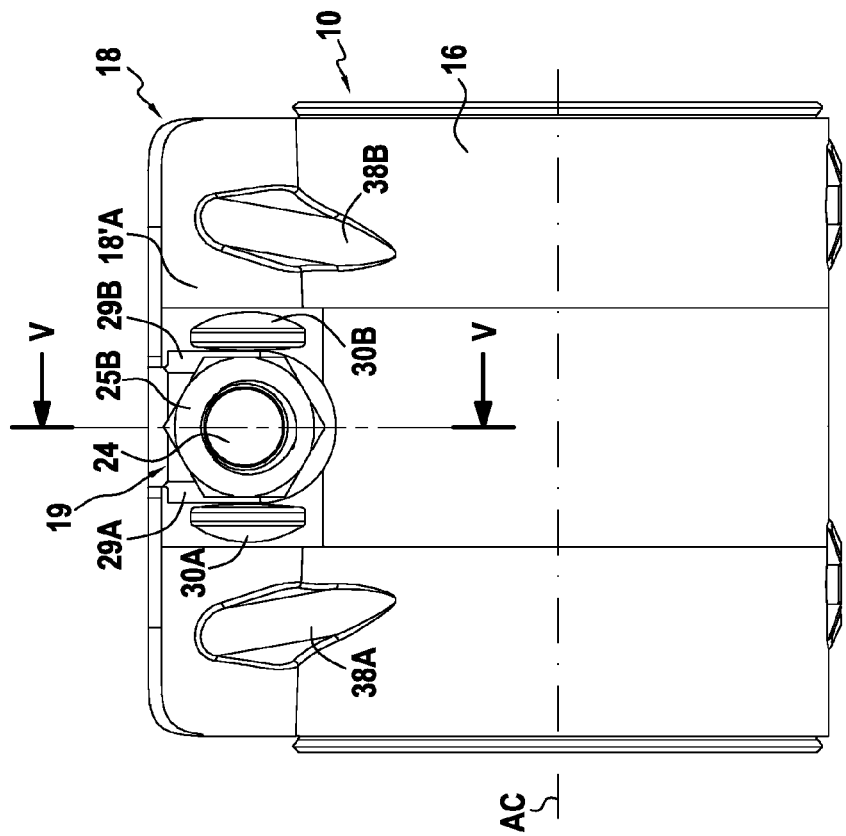
FIG. 3 is a side view, seen looking along arrow III of FIG. 1.

With reference to FIG. 3, it can be observed that the back face 18'A of the front portion of the lug 18 is provided with ribs, respectively 30A and 30B, that extend along the longitudinal axis AB (see FIG. 6) of the strip B. The flanges 29A and 29B of the extension 19 of the lug are retained between said ribs 30A and 30B that prevent them from moving apart.

The back face 20'B of the other lug 20 is equipped with analogous ribs also for retaining the flanges 31A and 31B so as to prevent them from moving apart.

Figure 4:
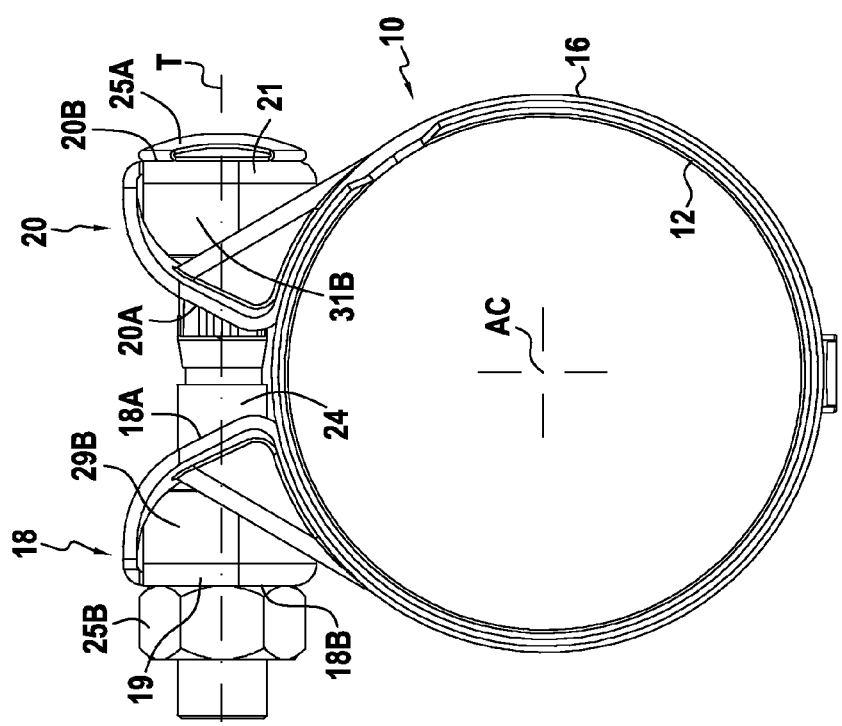
FIG. 4 is an end view, seen looking along axis AC of FIG. 3.
Figure 5B:
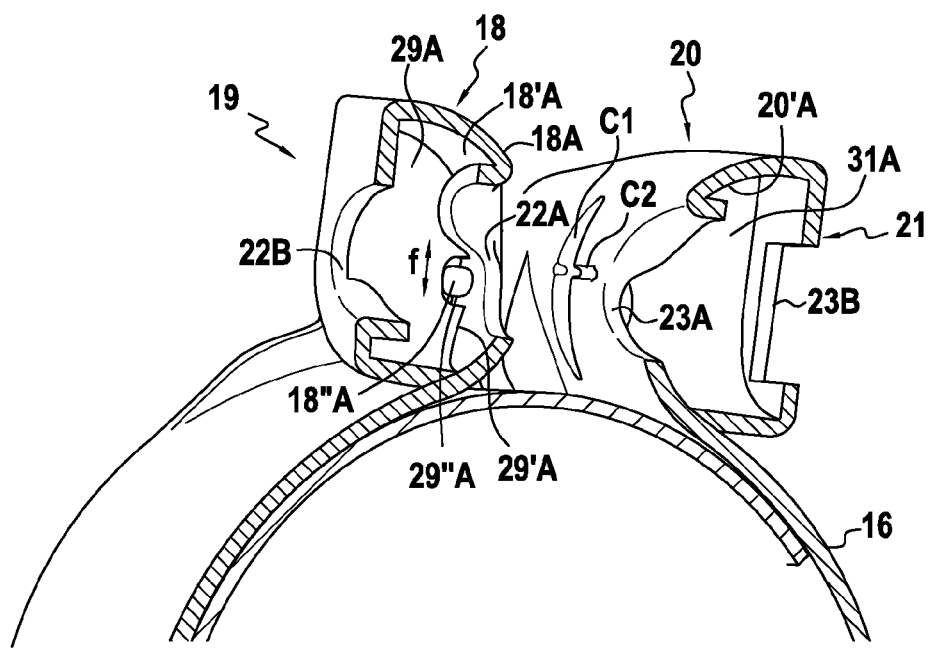
FIG. 5B is a view analogous to FIG. 5A, for a variant embodiment.

FIG. 5B shows a variant embodiment in which, in addition, the flanges are also retained so as to prevent them from sliding against the back face of the lug in a plane that is substantially perpendicular to the axis AC of the belt. This plane is thus parallel to the plane on which the section view of FIG. 4 is taken. The shaping making this retaining possible can be seen more clearly for the lug 18 in FIG. 5B. In this figure, it can be seen that the free edge 29'A of the flange 29A has a notch 29"A and that the back face 18'A of the front portion 18A of the lug has a projection 18"A engaged in said notch. It can be understood that this shaping prevents the free edge of the lug and the back face 18'A from sliding relative to each other in the directions indicated by the double-headed arrow f shown in FIG. 5B.

Like the above-mentioned ribs 30A and 30B, the projection 18"A may be formed by stamping from the front portion of the lug in question. Thus, for the lug 20, it is possible to see the stamped recessed shape C1 of the front portion of the lug that, on its back face, forms one of the ribs preventing the flanges of the extension from moving apart, and to see the stamped recessed shape C2 that, on the same back face, forms the projection suitable for co-operating with a notch in the free edge of the flange 31A.

Figure 8:
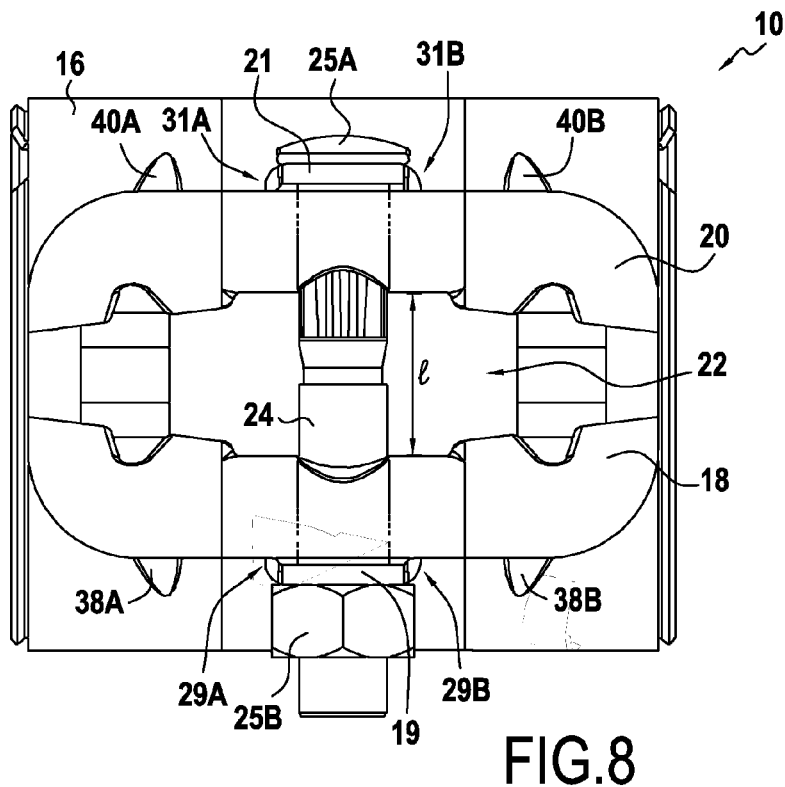
FIG. 8 is a plan view of the collar of FIG. 1 in the non-tightened state.
Figure 9:
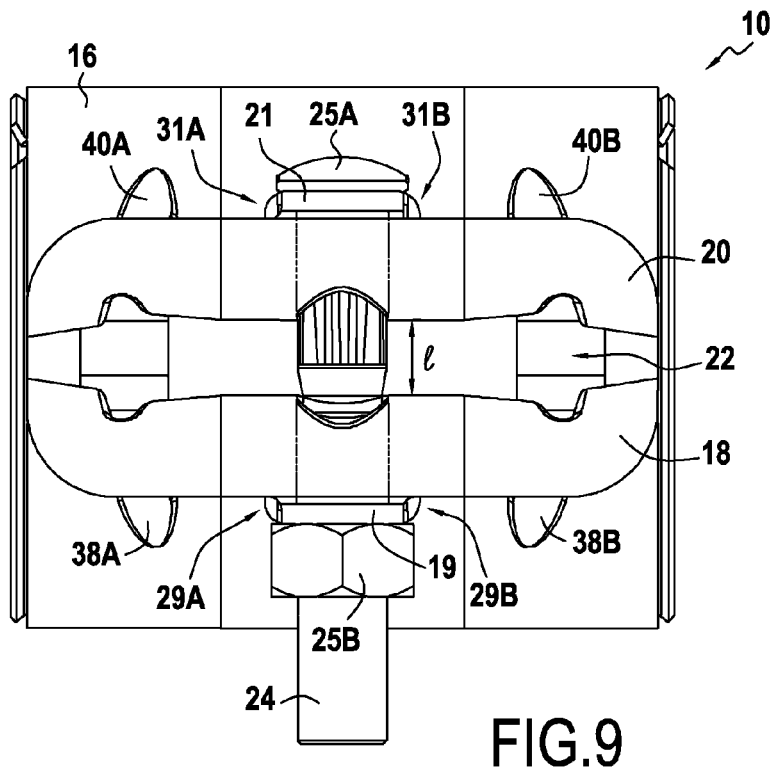
FIG. 9 is a view analogous to FIG. 8, showing the collar in the tightened state.

Consideration is given below to another aspect of the clamping device of the invention. This aspect is the curvature of the front portions of the lugs, making it possible to achieve a "keystone" effect facilitating distribution of the tightening forces. In FIG. 8, which shows the state of the device before the collar is tightened, it can be seen that the tightening space 22 has a width l, as measured in the longitudinal direction of the tightening rod 24 that is greater around said rod than in the regions of the lugs that are remote from the rod in question. Conversely in FIG. 9, which shows the state of the device after the collar has been tightened, it can be seen that the width k of the space 22 is substantially constant throughout the central region of the lugs, except for the recesses caused by the reinforcing ribs 38A and 38B of the lug 18 that are stamped from the front portion of said lug and that thus project from its back face, and by the ribs 40A and 40B formed in the same way for the lug 20. This exception to the substantially constant nature of the width k is also valid for the end portions of the lugs that are further away from the tightening rod, but, as explained below, this concerns only the bases of the lugs in their connection portions where they are connected to the belt.

Figure 10:
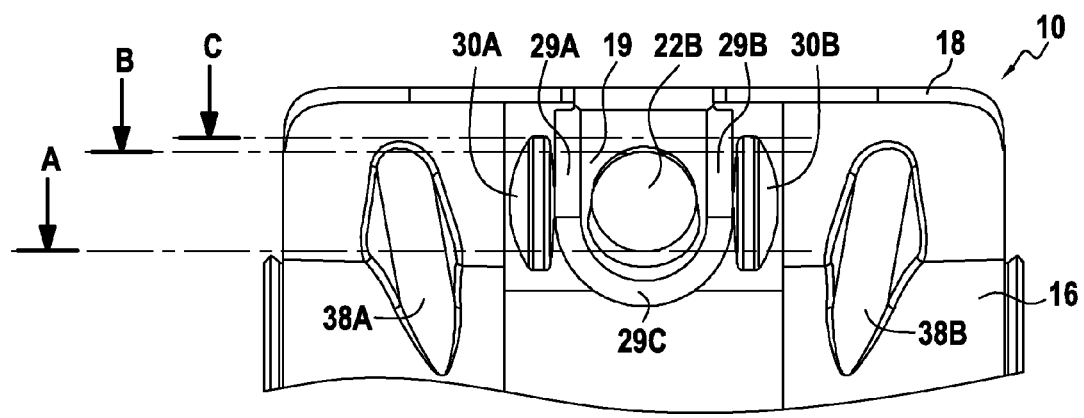
FIG. 10 is a fragmentary view, corresponding to the top portion of FIG. 3, while the tightening bolt is not present.

In order to enable this particular configuration of the clamping device to be illustrated more clearly, a plurality of sections are taken on the planes A, B, C indicated in FIG. 10, with the collar being both in the tightened state and in the non-tightened state. The situation before the collar is tightened is thus shown by FIGS. 11A, 11B, and 11C corresponding to respective ones of the section planes A, B, and C. Each of these section views is taken on a plane that is parallel to the axis AC of the belt and that contains the axis T of the tightening rod, the plane A containing the bottom edge of the hole 22B that is closer to the axis AC, the plane B containing the opposite top edge of the hole 22B, and the plane C being situated very slightly beyond the plane B going away from the axis AC. The height of the tightening rod is thus defined between the planes A and B.

The three planes A, B, and C are planes of concavity in which the intersection where the lug 18 or 20 intersects the plane co-operates over most of its length with a concave reference curve, respectively CR18 for the lug 18 and CR20 for the lug 20, whose trough is situated in the region of the tightening rod which, in the figures, is represented by its axis T.

With reference to FIGS. 11A and 11B, between which the height of the tightening rod 24 extends, as measured perpendicularly to the axis AC of the belt and to the longitudinal direction of said rod (along the axis T), it can be seen that each of the front portions 18A and 20A of the lugs has a central portion, respectively C18 and C20, and two side portions, respectively L18 and L20 that have shapes such that the side portions protrude towards the opposite lug relative to the central portion, at least over the height of the rod. The length of each of the central portions C18 and C20 measured along the axis AC of the belt corresponds to about ⅓ of the front portion of the lug in question. Similarly, the length of each of the side portions corresponds to about ⅓ of the length of the lug in question. Overall, the belt is symmetrical about a radial plane containing the axis T. In this example, as can be seen in FIG. 11A, the central portions are substantially rectilinear, whereas the side portions are inclined such that their end edges, opposite from the central portion, are closer to the opposite lug than their connection portions via which they are connected to the central portion. In the regions in which the side portions are connected to the central portion, it can be seen in the section view of FIG. 11A corresponding to the bottoms of the holes 22A and 23A that the curves CR18 and CR20 have zones of inflection. These inflections diminish on going away from the axis AC of the belt, and it can be seen that they have disappeared in the section views of FIGS. 11B and 11C.

Considering the situation in which the collar is in the tightened state, with reference to FIGS. 12A, 12B, and 12C, it can be seen that the curves CR18 and CR20 have straightened up so that they have lost their concavity. This applies, in particular, in FIGS. 12B and 12C, in the section planes corresponding to the top edges of the holes 22A and 23A and to a region slightly above said top edges. In FIG. 12A, the section is taken through the bottoms of the holes 22A and 23A, in the immediate vicinities of the connections via which the lugs are connected to the substantially cylindrical portion of the belt, and it can be seen that, in this region, the side portions L18 and L20 have kept a small amount of inclination bringing their free ends closer to the opposite lug. Immediately at the bases of the lugs, and in the regions remote from their respective holes, said lugs have protruding portions facilitating continuity of bearing of the belt against the object to be clamped. Conversely, in the section views of FIGS. 12B and 12C, the lugs are almost rectilinear and the side portions L18 and L20 even tend to extend slightly away from the opposite lug going towards their free edges. The protrusion of the edges of the side portions 18 and 20 progressively diminishes going away from the belt so as to disappear substantially half-way up the height of the tightening rod.

The "keystone" effect due to the particular shaping of the tightening lugs is particularly useful for making the tightening forces more uniform when the belt has a long length as measured along the axis AC of said belt.

As can be seen in FIG. 13, another way of making the tightening forces more uniform for belts of long lengths consists in equipping the collar with a plurality of pairs of lugs disposed in succession along said length. Thus, in FIG. 13, it is possible to see two pairs of lugs, respectively 50 & 60 and 59 & 61, that are juxtaposed in the length direction of the axis. For each pair of lugs, the tightening system comprises a tightening rod and tightening members that are the same as those of the above-mentioned type. It can also be seen that each lug has shaping analogous to the shaping of the above-described lugs in that the back faces of their front portions have wedging ribs for the flanges of the extensions. In order to tighten each set of tightening equipment independently from the other one, the belt has a slot FC between the juxtaposed pairs of lugs. Naturally, using a plurality of juxtaposed pairs of tightening lugs does not preclude implementing each lug with a keystone effect, by imparting concave shapes to them over the entire height of the tightening rod that passes through them. Naturally, the holes in the lugs of the collar of FIG. 13 may have visors analogous to the above-mentioned visors 26A, 26B, and 27A.

The invention claimed is:

1. A clamping device comprising a collar suitable for being placed around objects to be clamped, the collar having a substantially cylindrical metal belt, at least one pair of lugs that project relative to said belt and that define a tightening space between their respective front portions of said lugs, and at least one tightening rod and two tightening members co-operating with said rod, and with respective ones of bearing portions of the two lugs of the pair, so as to bring said lugs together in such a manner as to cause the belt to be tightened by reducing its diameter, at least a first one of the lugs of the pair being a lug having an extension, the bearing portion of which first lug is formed in an extension of said first lug, which extension is folded back towards the back of said first lug, away from the second lug of the pair of lugs, and is provided with a hole for receiving the tightening rod and that is situated facing a hole in the front portion of said first lug, a bracing space being provided between the folded-back extension and said front portion, each of the holes in the extension and in the front portion of the first lug having an edge portion provided with a visor that extends into the bracing space, and an edge portion that is not provided with a visor and that extends facing the visor of the other one of said holes.

2. The device as claimed in to claim 1, wherein the visors are folded-back portions of the edges of the holes.

3. The device as claimed in claim 1, wherein the visor of the hole in the extension is closer to an axis of the belt than the visor of the hole of the front portion.

4. The device as claimed in claim 3, wherein the hole of the bearing portion of said second lug of the pair has an anti-rotation outline.

5. The device as claimed in claim 1, wherein the second lug of the pair of lugs is also a lug having an extension, the bearing portion of which second lug is formed in an extension of said second lug, which extension is folded back towards the back of said second lug, away from the first lug of the pair, and is provided with a hole for receiving the tightening rod and that is situated facing a hole in the front portion of the second lug, a bracing space being provided between the folded-back extension and said front portion.

6. The device as claimed in-claim 5, wherein at least the hole in the front portion of said second lug of the pair has an edge portion provided with a visor extending over only a portion of the periphery of said hole.

7. The device as claimed in claim 1, wherein, when the collar is in the non-tightened state, the width-of the tightening space, as measured in the longitudinal direction of the tightening rod, is greater around said rod than in regions of the lugs that are remote from the tightening rod over at least substantially the entire height of the tightening rod, as measured perpendicularly to an axis of the belt and to a longitudinal direction of said rod.

8. The device as claimed in claim 7, wherein, seen in a plane parallel to the axis of the belt, and containing an axis of the tightening rod, and when the belt is in the non-tightened state, each lug of said pair has a concave shape, a concave side of which faces towards the other lug of the pair.

9. The device as claimed in claim 7, wherein there exists at least one plane of concavity that is parallel to the axis of the belt and to the longitudinal direction of the tightening rod, in which plane the intersection via which a lug of the pair intersects with said plane coincides, over most of its length with a concave reference curve having a trough lies in the region of the tightening rod.

10. The device as claimed in claim 7, wherein each of the front portions of the two lugs of the pair of lugs has a central portion, and two side portions that extend over at least the height of the tightening rod, as measured perpendicularly to the axis-of the belt and to the longitudinal direction of said rod, and that have shapes such that the side portions protrude towards the opposite lug relative to the central portion at least over said height of the tightening rod.

11. The device as claimed in claim 10, wherein, for each lug of the pair, said central portion and each of said side portions extends over about $\frac{1}{3}$ of the length of the front portion of the lug in question, said length being measured along the axis of the belt.

12. The device as claimed in claim 1, wherein the extension has flanges co-operating with a back face of the front portion of the extended lug, on either side of the hole of said front portion.

13. The device as claimed in claim 12, wherein the flanges are formed by stamping the extension.

14. The device as claimed in claim 12 wherein the flanges of the extension are retained so as to prevent them from moving apart.

15. The device as claimed in claim 12, wherein, at least one flange of the extension is retained so as to prevent said flange from sliding against the back face of the lug in a plane substantially perpendicular to the axis of the belt.

16. The device as claimed in claim 15, wherein one of the elements constituted by the free edge of the flange retained so as to prevent said flange from sliding against the back face of the lug in a plane that is substantially perpendicular to the axis of the belt, and by the back face of the front portion of the lug is provided with a notch, while the other one of said elements is provided with a projection engaged in said notch.

* * * * *